G. S. MONSON.
RIVET HOLDING INSTRUMENT.
APPLICATION FILED FEB. 4, 1918.
1,288,115.
Patented Dec. 17, 1918.
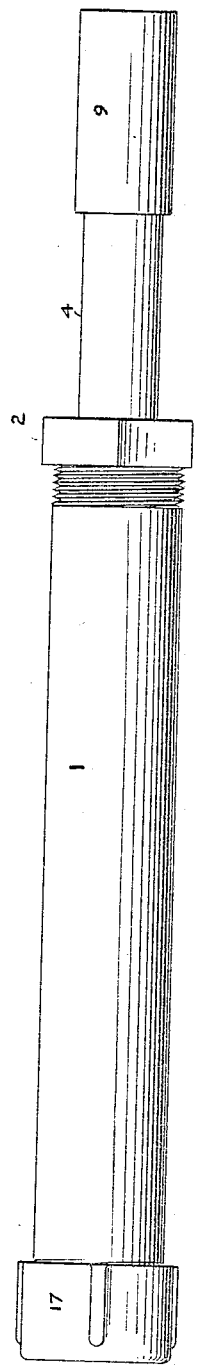
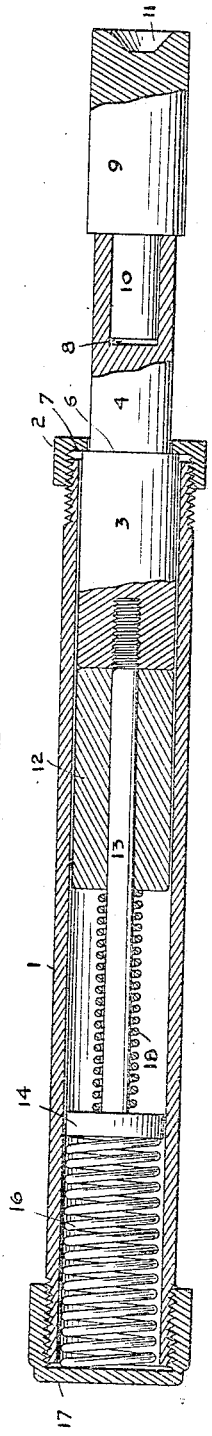
INVENTOR
G. S. MONSON
BY F. M. Wright
ATT'Y.

UNITED STATES PATENT OFFICE.

GEORGE S. MONSON, OF SAN FRANCISCO, CALIFORNIA.

RIVET-HOLDING INSTRUMENT.

1,288,115.  Specification of Letters Patent.  Patented Dec. 17, 1918.

Application filed February 4, 1918. Serial No. 215,241.

*To all whom it may concern:*

Be it known that I, GEORGE S. MONSON, a citizen of the United States, residing at San Francisco, in the county of San Francisco and State of California, have invented new and useful Improvements in Rivet-Holding Instruments, of which the following is a specification.

The present invention relates to improvements in tools, known to the operators as dolly bars, or holding-on hammers, used for holding rivets when being swaged in place by the pneumatic hammer.

It is found practically impossible to use such tools thus formed of a solid piece of metal in such a way as to prevent the head of the rivet from being changed in form while being riveted, the reason being that the longitudinal vibration imparted thereto by the pneumatic hammer is so great that it is practically impossible for the operator holding the instrument to prevent it from also vibrating laterally thus producing a change of shape in the red hot head of the rivet.

But in work done for the United States Government it is nearly always required that the heads of the rivets should be unchanged in form, which is generally frusto-conical.

The object of the present invention is to provide a rivet holding instrument which will not have the effect of swaging or disfiguring the head of the rivet but will leave said head, when the riveting is finished, in its original form.

In the accompanying drawing, Figure 1 is a side view of my improved rivet holding instrument; Fig. 2 is a longitudinal section thereof.

Referring to the drawing, 1 indicates a tubular casing externally threaded at each end. On its front end is screwed a reducing collar 2. In said casing is contained a cylindrical body 3 having a reduced cylindrical forward portion 4, said reduced forward portion forming with said body a circular shoulder 6. Said shoulder abuts against the inwardly extending shoulder 7 formed by the reducing collar 2. In the forward end of said reduced portion 4 is a cylindrical socket 8, and in said socket is received the reduced cylindrical rear portion 10 of a rivet holding head 9. Said rivet holding head is formed at its front end with a socket 11, which is of a form corresponding to that of the head of the rivet to be riveted, here shown as frusto-conical.

Also contained in said tubular casing to the rear of the body 3 is a tubular hammer block 12 through which passes a stem 13, the forward end of which is screwed into the rear end of the body, while the rear end has a head 14. A coiled spring 16 is interposed between said head and a cap 17 screwed upon the rear end of the tubular casing. A lighter spring 18 is coiled around the stem and is compressed between the hammer block 12 and the head 14 of the stem.

In use the rivet holder is held by the operator precisely like the ordinary rivet holder, that is, so that the socket 11 receives the head of the rivet. But while it is practically impossible, owing to the great vibration imparted thereto by the pneumatic hammer, to hold steady the ordinary rivet holder, which consists of a single piece of metal with a socket at the front end, with the present rivet holder the vibration is imparted, not to the casing 1, but to the body 3, and in turn is taken up by the inertia of the hammer block 12 and by the coiled spring 16, and it is quite practicable to hold the tubular casing steady, so that the socket in its rivet holding end does not move laterally or deform the red hot end of the rivet.

Consequently the rivets are swaged or riveted with the heads in their original shape.

I claim:—

In a rivet holding instrument, the combination of a tubular casing, a device movable therein and provided at the front end with means for holding the head of a rivet, a spring in the casing for receiving the vibration of the device, a stem screwed into the device and having a head abutting against said spring, a tubular hammer block slidable upon said stem, and a coiled spring between said head and hammer block.

GEO. S. MONSON.

Copies of this patent may be obtained for five cents each, by addressing the "Commissioner of Patents, Washington, D. C."